March 7, 1933.  G. VON WEBERN ET AL  1,900,030
SURFACE DECORATING MACHINE
Filed May 28, 1930   5 Sheets-Sheet 1

March 7, 1933.   G. VON WEBERN ET AL   1,900,030
SURFACE DECORATING MACHINE
Filed May 28, 1930     5 Sheets-Sheet 4

March 7, 1933.  G. VON WEBERN ET AL  1,900,030
SURFACE DECORATING MACHINE
Filed May 28, 1930   5 Sheets-Sheet 5

Inventors
Guido von Webern
Edward W. Namant
By Bates, Golrick & Teare
Attorneys

Patented Mar. 7, 1933

1,900,030

UNITED STATES PATENT OFFICE

GUIDO VON WEBERN AND EDWARD W. HAMANT, OF DAYTON, OHIO, ASSIGNORS TO OXFORD VARNISH CORPORATION, OF DETROIT, MICHIGAN, A CORPORATION OF MICHIGAN

SURFACE DECORATING MACHINE

Application filed May 28, 1930. Serial No. 456,337.

The primary object of this invention is to provide a surface decorating machine which will be effective in operation to decorate widely deviating surfaces of blanks of various shapes.

Another object is to provide a surface decorating machine which will operate in an efficient manner to grain hollow articles, such as sheet metal boxes and the like.

Still another object is to provide a graining machine in which generally hollow articles, such as U and L shaped blanks, may be effectively grained on a plurality of surfaces thereof in one continuous operation.

A still further object is to provide a graining or surface decorating machine which will be simple in construction, and which will be effective in operation for graining hollow articles such as previously mentioned, on a plurality of sides successively and for general graining work as well.

Other objects and features of the invention will be hereinafter set forth in connection with the following description. The description relates to the preferred forms of the machine illustrated; these forms, however, being capable of many modifications not shown. The essential characteristics are summarized in the claims.

For the purpose of illustration only, I have shown in the drawings one shape which may be effectively grained or decorated by the machine shown. In general, the blanks which the machine was specifically designed to handle may be said to be hollow or generally hollow. Blanks such as U-shaped, L-shaped sections and boxes are recessed in such manner that they cannot be readily grained by the ordinary methods, without a large number of operations, and without requiring special supports or mandrels. The present machine handles all these and similar shapes without special adapters or mandrels and grains or decorates the several contiguous but deviating surfaces it is desired to decorate, in a continuous manner.

The mechanism forming the essential novelty of the present invention is shown in connection with a general graining machine of the type disclosed in the prior application of Guido von Webern and Edward W. Hamant Serial No. 406,018, filed November 9th, 1929, and assigned to the assignee hereof. It will be understood that in general other graining machines than that shown may be adapted for use with the present improvements.

Referring again to the drawings, and first to Figs. 1 to 5, the machine shown is a vertical surface graining machine adapted for graining surfaces disposed vertically, or nearly so. The primary elements of the machine comprise a pattern roll 1, a transfer roll 2 and a pressure roll or platen 3, for carrying the work to be grained or otherwise decorated, into printing contact with the transfer roll.

At this point it may be stated that it is not essential that there be a separate pattern element such as shown, inasmuch as the pattern transfer roll 2 may have the design formed thereon. The pattern transfer element may further be embodied in shapes other than cylindrical rolls. For example, it may comprise a belt or a ribbed or grooved generally cylindrical roll adapted for impressing surfaces other than generally smooth surfaces such as shown on the blank in the machine (Fig. 2).

The elements mentioned may be supported on main machine frame members comprising, as shown, a standard 5 and a sub-base 6 carried thereby in any suitable manner and secured as by bolts, not shown. The pattern and transfer roll are supported on the sub-base as will now be described.

Figure 1:
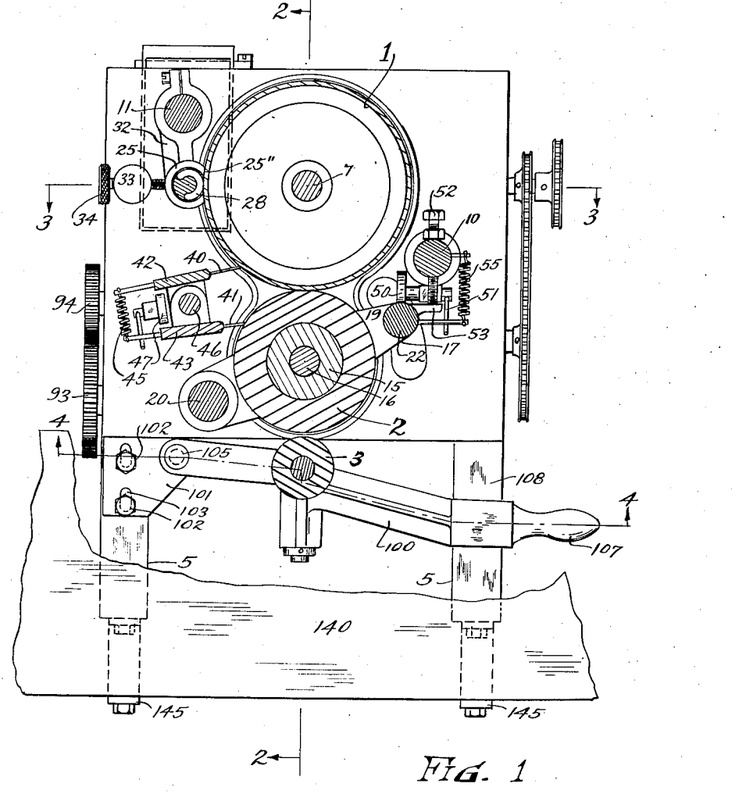
Fig. 1 is a sectional plan view showing the general arrangement of parts of a graining machine incorporating the invention.
Figure 2:
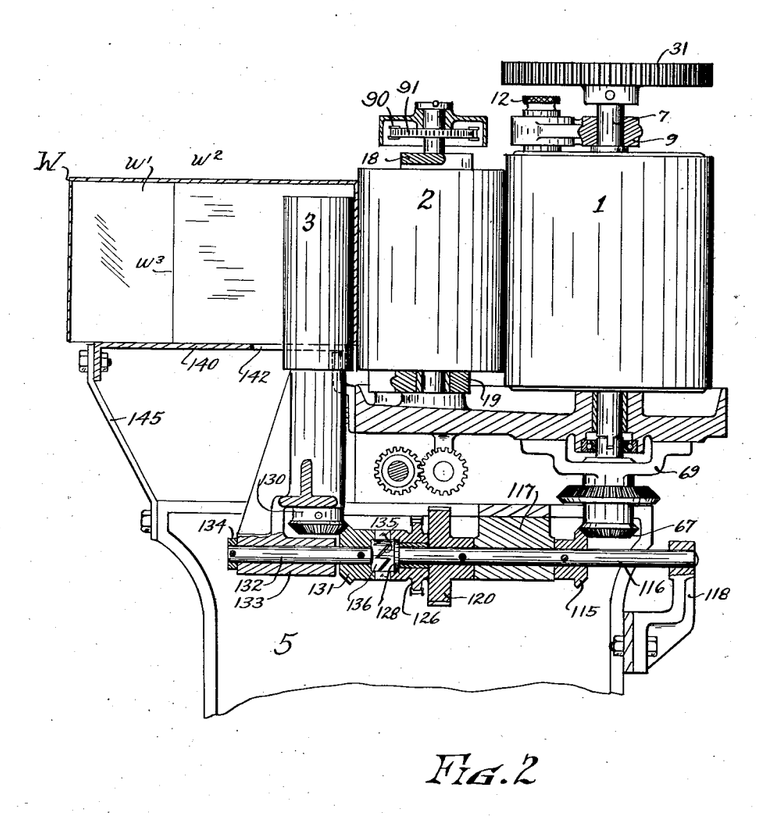
Fig. 2 is a longitudinal vertical sectional view thereof, taken along the line 2—2 on Fig. 1.
Figure 3:
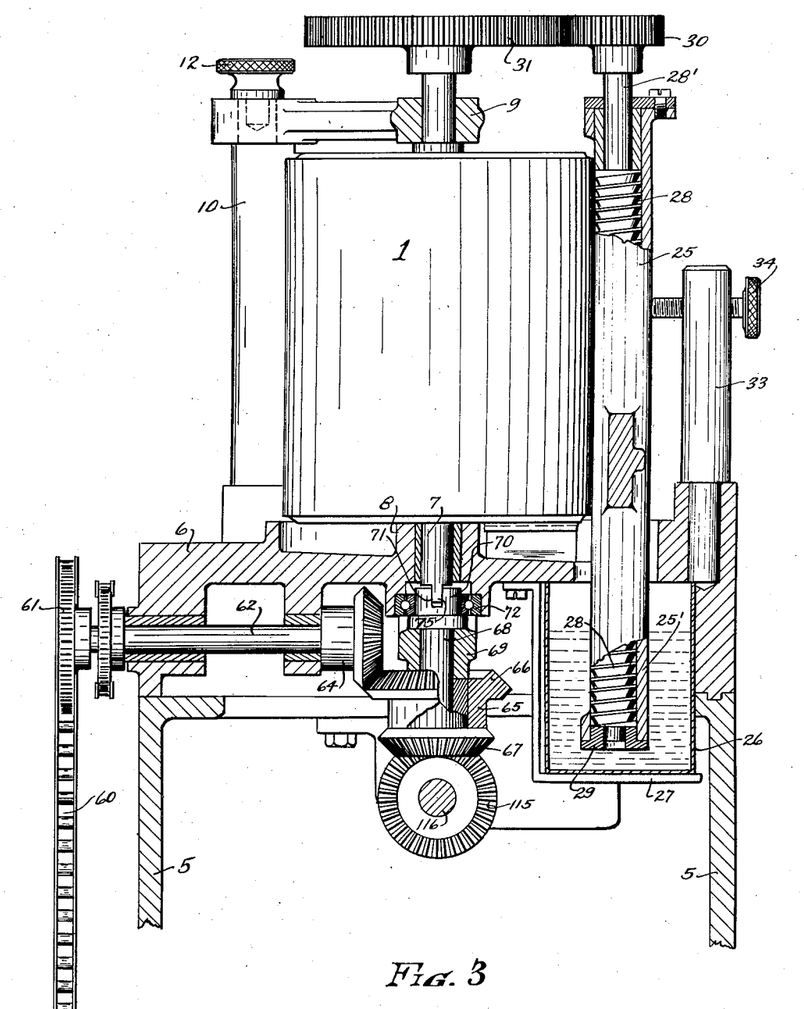
Fig. 3 is a transverse sectional view taken along the line 3—3 on Fig. 1.
Figure 4:
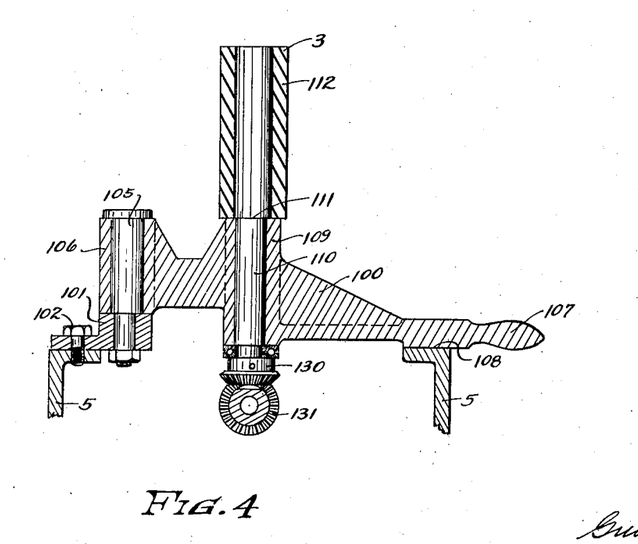
Fig. 4 is a sectional detail view taken substantially along the line 4—4 on Fig. 1.

Referring to Figs. 1, 2 and 3, the pattern roll which is shown as a hollow cylinder having a central shaft 7, may have any suitable pattern thereon. For example, an intaglio pattern of a wood grain design may be etched on the outer surface in accordance with the patent to J. P. Henry No. 1,548,465, or in any other suitable way. The shaft 7 extends downwardly through a boss formation 8 on the sub-base 6 at one end and extends upwardly through an overhanging cross bar 9 secured as on posts 10 and 11, the connection to only one of these posts, namely, 10 being shown. The bar may be removably secured as by hand screws, one of which is shown at 12, Fig. 3. The lower end of the shaft 7 has associated therewith a driving arrangement for the pattern roll which will be later described.

The transfer roll 2 may comprise a suitable ring of resilient material, such as congealed glue and glycerine on a suitable core 15, and has a driving shaft at 16. The driving shaft may be carried on a rocking support or frame 17 which has upper and lower arm portions 18 and 19 joined by a post 20 rising from the sub-base 6 and a vertical end bar 22 joining the arms 18 and 19. The purpose of the swinging mounting is so that the transfer roll may be carried out of contact with the pattern roll whenever the machine is left standing idle. The transfer roll is also driven positively in the machine shown, as will be hereinafter described.

For applying pigment to the pattern roll, we may employ the device shown particularly in Figs. 1 and 3. This comprises a screw type of pump, there being a pump casing 25 in vertical position with its lower end 25′ extending into a tank or reservoir 26 for liquid pigment, such as paint or varnish. The tank may be supported on a bracket 27 and may be slid in and out with relation to the sub-base 6. Turnable within the pump casing is a screw 28 on a suitable shaft 28′ extending out of the top of the casing, and having a suitable inserted bearing 29 in the bottom of the casing. The shaft may be driven by reason of a spur gear 30 thereon meshing with a spur gear 31 of larger diameter carried on the upper end of the shaft 7.

The side of the casing adjacent the pattern roll is machined off as at 25″ so as to provide an elongated opening extending from the pigment supply substantially the entire length of the pattern roll. When the pattern roll is driven, the screw will lift the pigment out of the reservoir and spread it onto the adjacent pattern roll surface in a uniform manner. The pump casing 25 may have a suitable bracket formation 32 thereon (see Fig. 1) embracing the post 11 heretofore mentioned, and an adjustment for maintaining the proper space between the discharge opening in the pump casing and the pattern may be provided by a post 33 and adjusting screw 34 carried thereby and engaging the casing behind the screw.

It will be understood that any suitable scraping device may be employed to remove the excess pigment from the pattern so that the pigment will be only in the interstices formed by the etching operation when the pattern engages the transfer roll. Likewise, it is necessary to scrape the residue of pigment from the transfer roll 2 after the latter has transferred the pattern to the work. Suitable scraping devices are shown in Fig. 1 at 40 and 41. The scrapers are mounted on suitable swinging supports 42 and 43 respectively, which may be maintained in such position that the scrapers bear in scraping contact with the respective rolls, by a tension spring 45 connecting the supports as shown in Fig. 1. The supports 42 and 43 may be pivoted to an upright rigid bar 46 and a suitable cam arrangement such as shown at 47 may be employed to spread the tail portions of the supports 42 and 43 manually to cause the scraper blades to withdraw from contact with the respective rolls when the machine is idle.

For adjusting the frame 17 which carries the transfer roll, so as to move the transfer roll out of contact with the pattern roll and thus prevent permanently deforming the material of the transfer roll, we may provide a cam 50 suitably supported adjacent the connecting bar 22 of the frame 17, there being an operating handle 51 by which the cam may be adjusted to thus move the frame. Suitable adjustment for contact pressure between the pattern and transfer roll may be afforded by an adjusting screw 52, one end of which abuts an ear 53 on the frame 17. The transfer roll may be yieldingly urged toward the pattern roll by a suitable spring 55. The driving arrangements for the various elements so far described may be as follows:

The standard of the machine supports any suitable driving mechanism, such as an electric motor and reduction gearing (not shown), and the reduction gearing may have its driven element connected with a suitable sprocket chain 60 (see Fig. 3) for driving a sprocket 61 on a counter-shaft 62 mounted in suitable brackets on the sub-base 6 and carrying at its inner end a bevel gear member 64.

which meshes with teeth 66 on a gear member 65, which also carries gear teeth 67. Rigid with the gear member 65 is a shaft 68 supported in a yoke-like bracket 69, depending from the sub-base and suitably secured thereto, as shown in Fig. 2. The upper end of the shaft provides a driving head 70 with a driving slot 71 for the pattern roll shaft, and may be supported in a ball bearing 72 of the usual construction. The slot 71 embraces a tongue 75 on the lower end of the shaft 7. This arrangement, while effecting a driving connection with the shaft 7, permits the shaft and pattern roll to be easily removed by simply drawing the shaft upwardly, assuming of course the cross bar 9 is removed.

Figure 5:
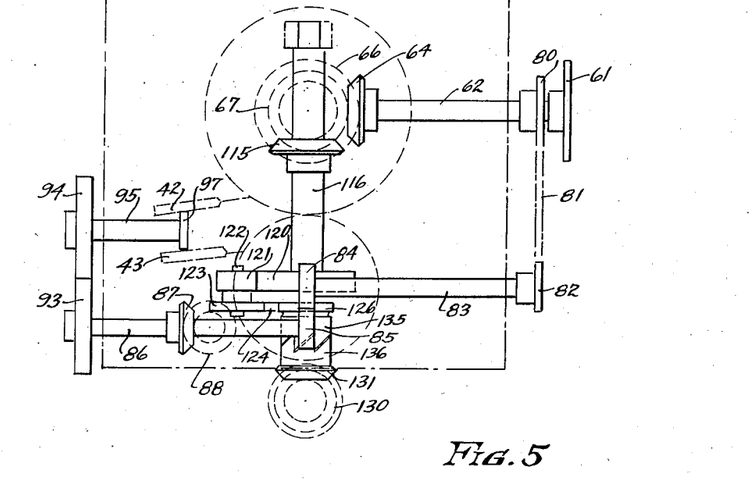
Fig. 5 is a diagrammatic illustration of the various gearing connections between the cooperating elements of the machine.

The drive for the transfer roll may be afforded by a gearing system shown diagrammatically in Fig. 5. Supported near the outer end of the shaft 62, between the sub-frame and the sprocket 61, is a sprocket gear 80. This is connected by a suitable chain 81 with a sprocket 82 on a cross shaft 83 suitably journalled below the sub-base. The shaft 83, as shown, is provided with a spur gear 84 meshing with a similar spur gear 85 on a shaft 86 mounted parallel to the shaft 83 and also below or in the sub-base. The shaft 86 carries a bevel gear 87 which meshes with a corresponding bevel gear 88 supported above the shaft 86 and on a vertical shaft (not shown). Such vertical shaft may have, at its upper end, a suitable sprocket which by means of a chain 90 (Fig. 2) drives a sprocket gear 91 rigidly carried by the transfer roll shaft 16.

It is desirable to vertically reciprocate the scraper blades 40 and 41 and for this purpose there is provided spur gearing, one element, namely that indicated at 93, Figs. 1 and 5, of which is carried on the shaft 86. The gear 93 meshes with a gear 94 on a shaft 95 extending within the sub-base in suitable bearings, and which carries at its inner end a cam 97. The cam may have a suitable connection, not shown, with both scraper blade mountings 42 and 43, to reciprocate the blades.

The above described mechanism is all shown in the prior application heretofore mentioned and may be utilized in connection with the present arrangement without substantial change. The improvements with which this application is mainly concerned are shown in one form in Figs. 1, 2, 4 and 5. In these figures, the platen or pressure roller 3 is supported in overhanging relation to the transfer roll by a swingable arm 100. The arm may be pivotally carried on one of the main frame members 5 by reason of an adjustable bracket 101 secured as by bolts 102 to the top side thereof. The adjustment for the bracket (see Fig. 1) may be provided by slots 103 in the bracket through which the fastening bolts 102 extend.

The bracket 101 carries an upwardly extending pivot pin 105 embraced by the vertically enlarged end portion 106 of the arm for a rigid support. The free end of the arm may have a suitable handle at 107 and a guiding surface at 108 resting on the frame member 5 opposite that to which the pivot bracket is connected.

Intermediately of the ends of the arm there is an elongated bearing formation 109 which carries a vertical shaft 110 on which the roller 3 is suitably fixed. The shaft 110 may be enlarged above the upper end of the portion 109 of the arm to provide a thrust shoulder at 111. The roller itself is preferably formed of resilient material to afford a friction driving effect against the surface of the blank to be decorated. As shown, there is a ring 112 of material, such as rubber, fixed to the enlarged upper portion of the shaft.

For driving the shaft 110, we preferably employ a gearing arrangement by which the roller 3 is automatically turned whenever the arm is swung to carry the roller into close proximity to the transfer roll. As shown particularly in Figs. 2, 3 and 5, the bevel gear 67 on the gear member 65, meshes with a bevel gear 115 on a counter-shaft 116 which, as shown, is carried in spaced brackets 117 and 118, the brackets being supported by the frame members 5 in any suitable manner. The shaft 116 projects to the left of the bracket 117, as shown in Fig. 2, and a speed increasing and direction changing gearing arrangement is associated with this projecting end of the shaft. Rigid on the shaft 116 is a spur gear 120 which meshes with a smaller gear 121 on a suitable shaft 122 positioned to the rear of the shaft 116 as viewed in Fig. 2 and on any suitable bearings (not shown). The smaller gear 121 carries, drivingly rigid therewith, a sprocket wheel 123 which, through the medium of a sprocket chain 124, drives a sprocket wheel 126 loosely journalled on the outwardly projecting end of the shaft 116. The shaft 116 may have an enlarged head 128 within the hub of the sprocket wheel 126 to hold the sprocket wheel in place. The arrangement described results in a reversed driving condition between the shaft 116 and the sprocket 126, and the sprocket is driven at considerably increased speed over the shaft 116, so that the peripheral speed of the pressure roll to be driven by the sprocket, as will be presently shown, will be the same as that of the transfer roll and in the proper direction to feed the work.

To effect a driving connection between the sprocket 126 and the shaft 110 of the pressure roller whenever the arm is moved to carry the pressure roller close to the transfer roll, there is provided a bevel gear 130 on the lower end of the shaft 110 which meshes with a bevel gear 131 on a shaft 132 supported in an underhanging bracket portion or extension 133 of the arm. The shaft 132, together with the bevel gear 131, moves with the arm at all times, there being a collar 134 pinned to the outer end of the shaft 132 to prevent substantial endwise movement thereof in the bearing. Both the bevel gear 131 and the sprocket 126 carry on their hubs cooperating clutch tooth formations, these being respectively designated 135 and 136.

It will be seen that as the arm is moved to carry the roller away from the transfer roll, the drive thereto will be disconnected, but as it is moved up so as to press work against the transfer roll the drive is re-established to properly turn the roller.

For supporting work in operative relation to the pattern transfer roll and the pressure roller any suitable conveyor arrangement may be employed. As shown, however, there is a fixed plate 140 on which the work may rest, the plate having an opening 142 through which the roller 3 extends adjacent the transfer roll. This conveyor or guide arrangement may be modified to include suitable rolling elements of any type to facilitate movement of the work on the guide. The guide 140 may be supported on suitable brackets one of which is shown at 145 connected to one of the frame members 5.

It will be understood that the arrangement shown may be used for general graining or decorating purposes, such for example, as metal frame sections of various shapes. If these are not joined at their ends they may be fed between the transfer roll and pressure roller in the ordinary way, while supported on the guide. The primary purpose of the arrangement is to grain or otherwise decorate generally hollow articles, such as L-shaped pieces of work, U-shaped and closed hollow articles, such as boxes, rings and the like. The piece of work illustrated at W is a polygonal box having side walls W1, a top wall W2, and corners W3. It will be seen that this work blank extends in loosely embracing relation to the roller 3, as shown in Fig. 2 for example, and when the roller is moved, as by means of the arm 100, to press the outer side surface of the work against the transfer roll then, assuming either the roll or roller or both are being driven, the piece will travel about the roller 3, changing its direction whenever necessary, as determined by the shape of the piece. The blank shown, for example, will travel in a rectilinear direction normal to a plane cutting the axes of the transfer roll and roller until one of the corners is presented to printing position, and then the piece will swing to present another straight surface, but meanwhile the entire corner is effectively grained or decorated with whatever design is presented by the transfer roll. It has been found that this work is of exceptional quality, and the operation on various types of blanks is continuous to grain various deviating surfaces thereof. In general, the blanks, except for very special shapes, require no mandrel and a great deal of expense and trouble is saved thereby. In graining L or U-shaped pieces, such as parts of a box or frame, the work, as previously suggested, need not be set down into embracing relation to the roller, but may be fed between the roll and roller in the ordinary way. Afterward the cooperative effect of the roll and roller will swing such pieces as required to continuously grain the surfaces.

Figures 6, 7:
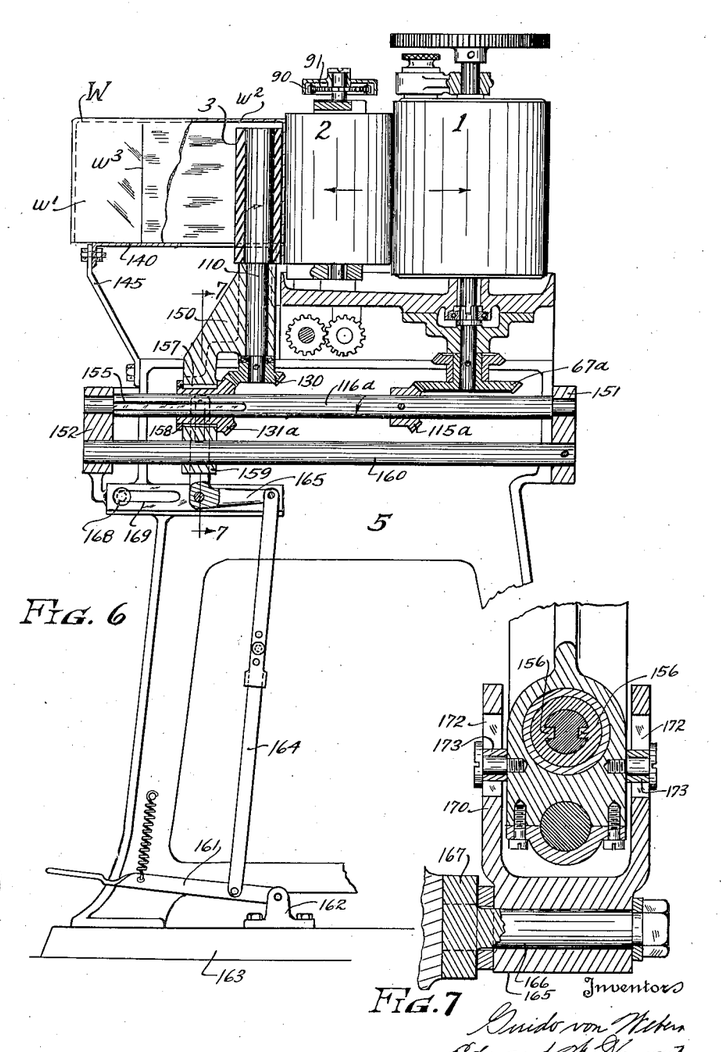
Fig. 6 is a view similar to Fig. 2, but showing a modified form of arrangement.
Fig. 7 is a detail cross sectional view taken substantially along the line 7—7 on Fig. 6.

Referring now to the modifications shown in Figs. 6 and 7, this modification is designed primarily, for handling work blanks of various thicknesses. This modification differs from the previously described arrangement mainly in the manner of supporting the pressure roller and driving the same. The pressure roller in this case is carried on a cross-head member 150, which is slidable on a shaft 116a supported at its ends in suitable bearing members 151 and 152 carried on the main frame members 5. The shaft 116a may be driven by means of a bevel gear at 115a which is in turn driven by a bevel gear 67a, the parts just mentioned corresponding in general to parts previously described in connection with the other groups of figures. In order to increase the speed of the shaft 116a to thereby effect the proper surface speed of the pressure roller, the bevel gear 67a is enlarged as compared to the arrangement previously described. The shaft 110 for the pressure roller carries, as before, a bevel gear 130 at its lower end and this meshes with a sliding bevel gear 131a, this being splined or otherwise made drivingly rigid with the shaft 116a while being permitted to be adjusted along the shaft. As shown, there are a pair of keyways 155 embracing inwardly extending key formations 156 within the gear 131a.

The gear 131a may be maintained in fixed relation to the cross-head, but permitted to turn, by any suitable journal device, for example a bearing member 157, and is prevented from longitudinal movement with relation to the bracket 150 by reason of a flange formation 158 fast on the hub. Placing the gear 131a on the side of the gear 130 opposite from the gear couple 67a—115a effects the desired direction of turning of the shaft 110 and the pressure roller.

The cross-head 150 has an additional sliding support by reason of an extension thereof at 159 which slidably embraces a guide bar 160, the latter being secured in the bracket members 151 and 152 on the frame.

To carry the roller toward and away from the transfer roll, the treadle arrangement shown may be used. This comprises a treadle arm 161 secured in a suitable bracket 162 on the base plate 163 of the machine, the treadle being connected as by means of an adjustable link 164 to a bell crank 165 supported as shown in Fig. 7, by a rigid stud 166 on a horizontally adjustable plate 167. The plate may be adjusted into and locked in various positions horizontally of the frame, so as to increase or decrease the operating distance of the roller from the transfer roll. The locking device may comprise bolts 168 extending into respective slots 169 on the plate 167. The bell crank 165 has a pair of arms 170 which embrace the bracket 150 between them. The arms may have slotted openings at 172 for receiving rollers 173 suitably secured to the cross-head on opposite sides thereof.

With this arrangement, the operator may use both hands in placing and removing the work and may apply the required printing and driving pressure with his foot. The general arrangement shown in Figs. 6 and 7 may however, incorporate a manually operable arm, such as previously described, that is to say, a hand arm may be substituted for the treadle and link connections.

We claim:

1. In a surface decorating machine, a frame, a pattern transferring member rotatably mounted on the frame, an arm pivotally mounted to the frame, a pressure member rotatably mounted on said arm, means acting on the arm to bring the members toward each other to effect an imprint on an article interposed between them, and a guide adapted to engage such article, the guide being arranged to maintain the position of the article while the same moves entirely about one of said members, whereby articles with variously deviating surfaces may be decorated on such surfaces in one continuous operation.

2. A surface decorating machine, comprising a pigment applying member mounted in substantially vertical position, a table adjacent thereto for supporting work and a roller projecting upwardly from the supporting surface of the table and adapted to be loosely embraced by the article to be decorated, said roller being pivotally mounted so that it can be moved with reference to said pigment applying member, whereby work of any thickness, between predetermined limits, can be decorated.

3. In a surface decorating machine a frame, a pigment transfer member rotatably mounted on said frame, means for applying pigment thereto and means for driving the member, a guide for work supported by the frame adjacent said member and having an opening therein an arm pivotally mounted to the frame, and a roller projecting through the opening in the guide adjacent the pigment transfer member and rotatably mounted to said arm to provide printing pressure on the surface of work supported on said guide between the roller and member.

4. A surface decorating machine for substantially hollow articles, comprising a frame, a member adapted to transfer a pattern to the hollow article vertically mounted on said frame, means for driving the member, a movable arm and a roller vertically mounted thereon, the latter adapted to enter the hollow article and be embraced by the same, means to move the arm to carry the roller into contact with the member, there being means for driving the roller at substantially the same peripheral surface speed as that of the transfer member.

5. In a surface decorating machine, an upright pigment transfer member and means for driving the same, a substantially horizontal guide for work arranged adjacent said member, a movable frame and a roller vertically mounted thereon, the latter projecting upwardly free from the guide, and the frame being disposed below the guide, whereby a hollow piece of work may be set down on the guide in embracing relation to the roller and whereby said roller and member will cooperate to drive the work.

6. In a surface decorating machine, a transfer roll and a pattern roll, means to supply pigment to the pattern roll for subsequent transfer to the transfer roll, a frame supporting said rolls and a sub frame adjustably mounted thereon for carrying a pressure roller, there being a pressure roller projecting in overhanging relation to the sub-frame in such manner as to permit work to be placed between the pressure roller and transfer roll by a movement endwise of the pressure roller, and gearing connecting one of said rolls with the roller, there being means to render the gearing automatically operable to drive the roller upon bringing the roller toward the transfer roll.

7. A surface decorating machine, comprising a frame, a transfer applying roll rotatably mounted on a substantially vertical axis carried by the frame, a pattern roll mounted to rotate on a second substantially vertical axis carried by the frame, a pigment well located in said frame, means to apply pigment from the well evenly to said vertical pattern roll, a guide adjacent the roll for supporting work and a roller projecting upwardly from the supporting surface of the guide, there being means below the guide to carry the roller into contact with work on the guide, and press the same against the transfer roll.

8. In a surface decorating machine, a frame, an upright transfer roller rotatably mounted thereon, means for applying a pigment pattern to the transfer roller, a table to support a thin sheet metal blank adjacent the transfer roller, with the lower edge of the blank resting thereon, an arm pivoted to said frame, an upright pressure roller mounted thereon and projecting freely from the table adjacent said transfer roller, whereby the work may be introduced between the roller by a movement parallel to the axis of one of the rollers, and the rollers rocked together by a pressure on the pivoted arm with sufficient pressure to cause the work to be advanced while guided on the table and simultaneously printed.

In testimony whereof, we hereunto affix our signatures.

GUIDO von WEBERN.
EDWARD W. HAMANT.

DISCLAIMER 1,900,030.—*Guido von Webern* and *Edward W. Hamant*, Dayton, Ohio. SURFACE DECORATING MACHINE. Patent dated March 7, 1933. Disclaimer filed August 8, 1941, by the assignee, *Oxford Varnish Corporation.*

Hereby enters a disclaimer to claims 7 and 8 of said patent.

[*Official Gazette September 2, 1941.*]